Aug. 7, 1945.   J. W. MAY   2,381,302
ELECTRIC OPERATING MEANS FOR CIRCUIT BREAKERS
Filed Feb. 13, 1942   3 Sheets-Sheet 1

Fig. 1.

WITNESSES:
E. A. McCloskey
G. S. Parker

INVENTOR
John W. May.
BY
Ralph H. Swingle
ATTORNEY

Patented Aug. 7, 1945

2,381,302

UNITED STATES PATENT OFFICE 2,381,302

ELECTRIC OPERATING MEANS FOR CIRCUIT BREAKERS

John W. May, Durham, N. C., assignor to Westinghouse Electric Corporation, East Pittsburgh, Pa., a corporation of Pennsylvania Application February 13, 1942, Serial No. 430,711

13 Claims. (Cl. 175—294)

The invention relates to circuit interrupters, and more particularly to electrical operating means or motor operating means for a circuit breaker.

In electrical operating mechanisms for closing circuit breakers, it is generally desirable to deenergize the electric closing means after a predetermined operation thereof. In the case of an electric motor operating means employing a rotatable member driven by the motor for closing the circuit breaker, a single rotation of the rotatable member is sufficient to complete the circuit closing operation, after which it is highly desirable to deenergize the motor and stop rotation of the member in order to prevent "pumping" or repeated reclosing operations if the circuit breaker fails to remain closed for any reason, as for example, when the circuit breaker is closed on a short circuit. When the motor energizing means is directly under the control of the operator, such as by a manual control switch, the operator may hold the control switch closed too long and cause "pumping" of the motor mechanism in the absence of suitable control means.

An object of the invention is the provision of a circuit breaker having an electric operating mechanism for closing the breaker and an improved control system for the closing means wherein "pumping" or recurrent reclosing operations are prevented during a single control operation.

Another object of the invention is the provision of an improved motor control system for a motor operated circuit breaker, wherein "pumping" or repeated reclosing operations of the motor operating mechanism are prevented as long as the closing control switch is held closed.

Another object of the invention is the provision of an improved control system for the electric closing mechanism or motor closing mechanism of a circuit breaker, wherein "pumping" or repeated reclosing operations are prevented by a simple electromagnetic relay energized as long as the closing control switch is closed and having a single armature held in unattracted position by a latch and automatically released in accordance with a predetermined movement of the closing means to permit operation of the relay.

Another object of the invention is the provision of an improved motor control system as described in the preceding paragraph, wherein the electromagnetic anti-pump relay has a relatively small air gap between its core and armature to provide a strong holding force for the armature when the relay operates.

Another object of the invention is the provision of an improved motor control system for the motor operating mechanism of a circuit breaker wherein pumping or repeated reclosing operations are prevented by an electromagnetic relay having contacts in the motor energizing circuit, and wherein a limit switch is provided in the system in parallel to the control switch and the relay contacts and arranged to close before the breaker starts to close and also prior to opening of the relay contacts so that no current interruption takes place at the relay contacts.

Another object of the invention is the provision of an improved motor control system as described in the preceding objects, which is simple, reliable in operation, and inexpensive to manufacture.

The novel features that are considered characteristic of the invention are set forth in particular in the appended claims. The invention itself, however, both as to structure and operation, together with additional objects and advantages thereof, will be best understood from the following detailed description of a preferred embodiment thereof when read in conjunction with the accompanying drawings, in which:

The invention is illustrated in connection with a circuit breaker of a particular type and construction. It is to be understood, however, that the invention may be applied to various other types of electrically operated or motor operated circuit breakers.

Figure 1:
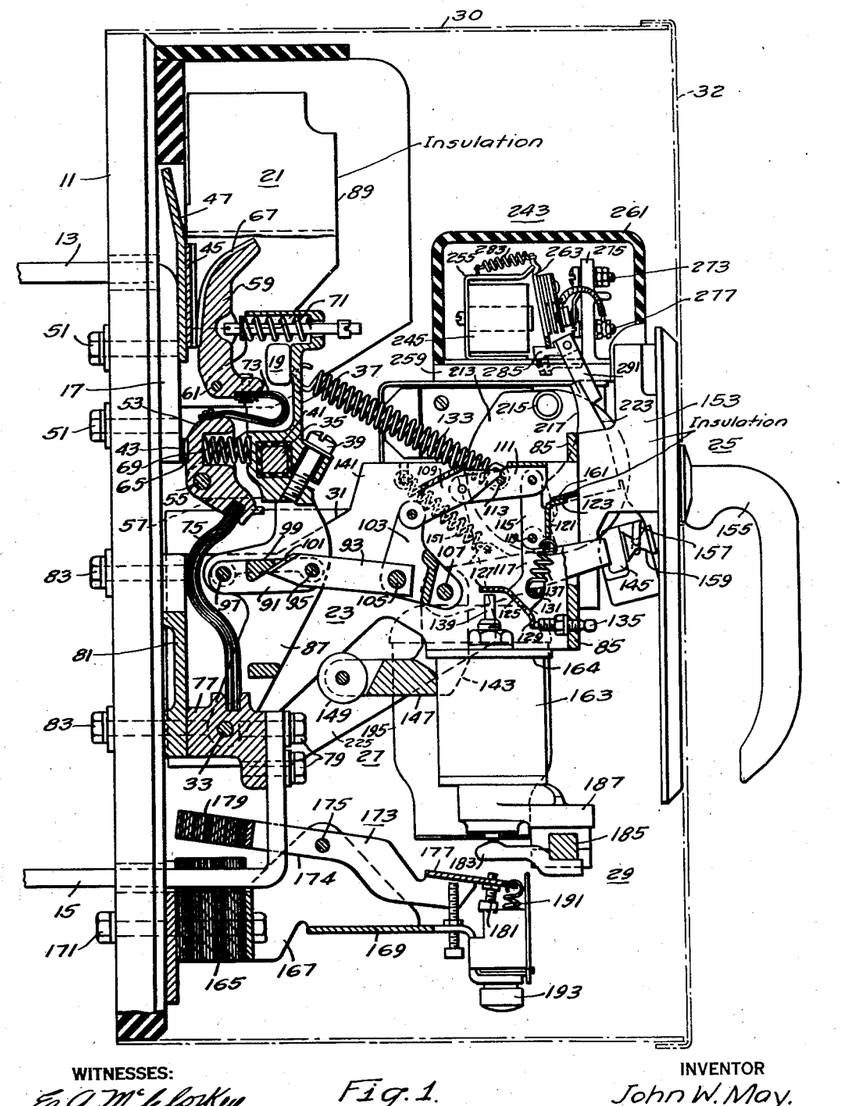
Figure 1 is a side elevational view, partly in section, of a motor operated circuit breaker embodying the motor control system of the present invention, the parts being shown in the normal position and the breaker in closed position.

Referring to Fig. 1 of the drawings, the circuit breaker is of the three-pole type, only the center pole being shown. The circuit breaker is mounted on a flat rectangular base 11, of strong insulating material, and comprises, in general, a pair of terminals 13 and 15 for each pole, stationary contact means 17 and cooperating movable contact means 19 for each pole, an arc-extinguisher 21 for each pole, a common actuating mechanism indicated generally at 23 for actuating the three sets of movable contact means 17, a manual operating means 25 and an electric motor operating means 27, each operable independently to actuate the actuating means, and a trip device indicated generally at 29.

The three poles of the circuit breaker are mounted side by side in spaced relation on the base 11, and the common actuating mechanism 23 is supported on a main frame 31 secured to the central portion of the base 11 in the space of the central pole. A casing 30 and the cooperating cover 32, indicated by the dotted lines, may be provided for the purpose of enclosing the circuit breaker.

With very slight exceptions, the construction of the terminals, conducting members, contact means and arc-extinguishers of each of the three poles of the circuit breaker is the same. The assemblage of the three movable contact means 19 (only one being shown) is pivoted to the main frame 31 by means of a pivot pin 33. A tie bar 35 extends across the three poles of the circuit breaker and serves to mechanically interconnect the three movable contact means 19 for simultaneous operation together by the common actuating mechanism 23; the pivot 33 for the central pole serving as a common pivot for the movable contact means of all of the poles. Each movable contact means 19 includes a contact arm 37 in the form of a split clamp member for engaging the tie bar 35, a screw 39 being provided as the fastening means. A square tube 41 of insulating material surrounds the tie bar 35 and is positioned between the tie bar and each of the contact arms or clamp members 37 to prevent short circuiting between the several poles.

The stationary contact means for each pole of the circuit breaker comprises a main contact 43 secured to the lower end of the terminal member 13, and an arcing contact 45 secured to an arc runner 47, the arc runner being, in turn, secured to the terminal 13. The terminal member 13 is secured to the base 11 by means of a pair of stud bolts 51. The angularly bent end of the terminal member 13 extends rearwardly and passes through an opening in the base 11 to serve as one of the upper terminals of the breaker.

The movable contact means 19 for each pole of the breaker comprises a main contact member 53 pivotally mounted by a pivot pin 55 carried by inwardly extending arms 57 of the contact arm or clamp member 37, and an arcing contact member 59 pivotally mounted by a pivot pin 61 supported by a second pair of inwardly extending projections of the contact arm or clamp member 37. The main contact member 53 has a main contact 65 secured thereto for engaging the stationary main contact 43, and the arcing member 59 has an arcing contact 67 secured thereto for engaging the stationary arcing contact 45. A pair of compression springs 69 and 71 are provided for biasing the contact members 53 and 59, respectively, in a counterclockwise direction about their pivot pins for the purpose of providing contact pressure between the contacts when the breaker is closed.

When the contact arm 37 is rotated in a clockwise direction to open the contacts, the springs 69 and 71 rock the contact members 53 and 59 toward the cooperating stationary contacts, and the arrangement is such that the arcing contacts 67 and 45 separate after separation of the main contacts during an opening operation of the breaker so that all arcing takes place between the arcing contacts. The contacts are arranged to engage in reverse order during closing operation of the contact arm 37, the arcing contacts being engaged prior to engagement of the main contacts.

A flexible shunt conductor 73 electrically connects the arcing contact member 59 to the main contact member 53, and the main contact member 53 is electrically connected by a flexible shunt conductor 75 to a block 77 of conducting material. The block 77 for the center pole is secured to the base of the main frame 31 between the side walls thereof. The blocks 77 for the outer poles (now shown) are secured to the base 11 by stud bolts and suitable spacing elements are interposed between the blocks 77 of the outer poles and the base 11. The conducting block 77 of the center pole has an opening extending therethrough for accommodating the main pivot pin 33.

Each of the lower terminal members 15 is secured at its upper end to a corresponding one of the conducting blocks 77 by cap screws 79. Each terminal member 15 is bent at right angles and the angularly bent portion extends rearwardly through an opening in the base 11 and forms the lower terminal stud of its pole of the circuit breaker.

The electrical circuit for each of the several poles is substantially the same, each circuit extending from the upper terminal 13 through the main contacts 43, 65, main contact member 53, flexible shunt conductor 75, and conducting block 77 to the lower terminal 15. The circuit through the arcing contacts extends from the upper terminal 13 through the arcing contacts 45, 67, arcing contact member 59, flexible shunt conductor 73, main contact member 53, flexible shunt conductor 75, and conducting block 77 to the lower terminal 15.

The main frame 31 comprises a metal casting having spaced side walls joined by a base portion 81 which is secured to the base by a plurality of stud bolts 83. The lower pair of stud bolts 83 pass through the base portion 81 and thread into the central conducting block 77 to retain this block in mounted position. The outer portions of the side walls are connected by integral cross members 85.

The contact arm or clamp member 37 of the center pole has a downwardly extending yoke 87 formed integral therewith, the arms of which extend between the side walls of the main frame 31 and pivotally engage the main pivot pin 33 of the movable contact assemblage.

Each of the arc-extinguishers 21 comprises a stack of magnetic plates (not shown) which are disposed adjacent the path of travel of the arcing contact 67, the plates being supported in an arc chute 89 of insulating material.

The actuating mechanism for the circuit breaker comprises a main operating toggle consisting of a pair of toggle links 91 and 93, and a collapsible holding linkage which is connected to the outer end of the operating toggle. The operating toggle and the linkage are disposed between the side walls of the main frame 31. The links 91 and 93 are pivotally connected together by a knee pivot pin 95, and the toggle link 91 is pivotally connected at its inner end by a pivot pin 97 to the portion 87 of the center pole contact arm 37. The link 91 is constructed as a double link having spaced sides joined by an integral cross-portion 99 which cooperates with a projection 101 of the other toggle link 93 to limit upward overcenter travel of the knee of the operating toggle. The link 93 is pivotally connected at its outer end to a lever 103 by means of a pivot pin 105. The lever 103 forms a part of the collapsible holding linkage and is pivotally mounted on a fixed pivot shaft 107 supported by the side walls of the main frame 31. One arm of the lever 103 cooperates with the operating toggle 91, 93 to form an additional toggle having the pivot pin 105 as its knee pivot. The other arm of the lever 103 is pivotally connected by a link 109 to a lever 111 which is pivoted intermediate its ends on a fixed pivot pin 113 supported by the frame 31. The other end of the lever 111 is pivotally connected to one end of a tripping toggle comprising toggle links 115 and 117 which are pivoted together by a knee pivot pin 119.

The tripping toggle link 115 has spaced sides connected by a cross-portion 121 which has an outwardly extending projection 123. The other tripping toggle link 117 has spaced side members joined by a cross-portion 125 which is provided with projections 127 and 129, and this link is pivoted on a fixed pivot pin 131 supported by the main frame 31.

The assemblage of the three movable contact means 19 (only one being shown) is biased in a clockwise direction to open circuit position by means of a circuit opening spring 133, one end of which is secured to the center pole contact arm 37 and the other end of which is connected to the fixed pivot pin 113. In the closed circuit position of the breaker, the operating toggle 91, 93 is in an extended overcenter position with the knee pivot 95 thereof disposed above a line joining the centers of the pivot pins 97 and 105 and the second toggle comprising two links 91, 93 and the inner arm of the lever 103 is also in an extended overcenter position with the pivot pin 105 above a line joining the centers of the pivots 97 and 107. In this position, the lever 103 is biased in a clockwise direction by the opening force applied to the movable contact assemblage by the opening spring 133 and the contact pressure springs 69 and 71. The lever 103, however, is normally held in fixed position and is prevented from being rotated in a clockwise or opening direction by the remaining portion of the holding linkage comprising the link 109, lever 111, and the tripping toggle 115, 117. The tripping toggle 115, 117 may be disposed either in dead center position or in a slightly overset position with the knee pivot 119 thereof to the left of the center line between the pivot pin 131 and the pivot pin which connects the link 115 to the lever 111. The position of the tripping toggle is adjustably determined by an adjusting screw 135 which extends through the cross-portion 85 of the main frame and engages the projection 129 of the tripping toggle link 117. The tripping toggle is biased to its extended or holding position by means of a tension spring 137 connected between the fixed pivot 131 and the yoke portion 121 of the other toggle link 115. This spring serves to prevent the tripping toggle from being collapsed by shocks or jars.

Opening operation of the circuit breaker is effected by collapsing the tripping toggle 115, 117. This toggle is adapted to be collapsed to trip the breaker by the operation of the trip device 29 which acts through a tripping plunger or trip rod 139. The trip device when actuated moves the trip plunger 139 upwardly causing it to strike the projection 127 of the toggle link 117 and rotate the link in a clockwise direction about its fixed pivot 131, thereby causing collapse of the tripping toggle. When the tripping toggle collapses, the opening bias applied to the assemblage of movable contact means acts through the main operating toggle to rock the lever 103 in a clockwise direction about its fixed pivot 107. The main operating toggle 91, 93 does not immediately collapse but travels as a unitary linkage with the contact arm 37 until the assemblage of movable contact means reaches open position against a stop 141 of the frame 31. At this time, the weight of the mechanism, linkage and parts causes the main operating toggle to collapse and the weight of the linkage causes the lever 103, link 109, lever 111 and tripping toggle 115, 117 to be automatically reset to their normal position shown in Fig. 1. The circuit breaker is now in full open position and the actuating mechanism is reset ready for a closing operation.

The actuating mechanism of the circuit breaker also includes a closing lever 143, which is pivoted intermediate its ends by means of the fixed pivot shaft 107. The closing lever 143 comprises a pair of spaced levers joined at their outer ends by a cross-bar 145, and also joined at their inner ends by a cross-bar 147, and this closing lever straddles the main frame 31, the two spaced levers composing the sides of the closing lever being located outside of the sides of the frame 31 and pivoted on the extending ends of the pivot shaft 107. The inner cross-bar 147 of the closing lever carries roller 149 supported on a shaft carried by spaced projections on the central portion of the cross-bar 147. This roller is adapted to engage the knee of the main operating toggle 91, 93 to thrust this toggle to extended over-center position upon clockwise or closing movement of the closing lever 143. The closing lever 143 is biased in a counterclockwise direction to the normal position shown in Fig. 1, by means of the retrieving springs 151 (only one being shown) connected at one end to the sides of the closing lever and anchored at their other end to the main frame 31. The circuit breaker is trip free, that is, the contacts are capable of being opened automatically irrespective of the position of the closing lever, and even if the closing lever is held in closed position.

The closing lever 143 is adapted to be moved to closed position either by the manual operating device 25 or by the motor operating mechanism 27. The manual operating device 25 is mounted in front of the actuating mechanism on an insulating support 153 secured to the cross-members 85 of the main frame 31, and this device comprises a rotatably mounted operating handle 155 having an operating shaft (not shown) rotatably supported in a bearing provided in the supporting member 153. A thrust link 157 is pivotally connected at its upper end to a crank (not shown) on the operating shaft of the handle, and this link is adapted to be moved downwardly upon clockwise rotation of the operating handle 155 to effect closing movement of the closing lever 143. The lower end of the thrust link 157 has a notch therein which separably engages a pulley shaped element 159 secured on the cross-bar 145 of the closing lever 143.

To manually close the circuit breaker, the operating handle 155 is rotated in a clockwise direction through an angle of substantially 90°. This movement is transmitted to the thrust link 157 and the thrust link moves the closing lever 143 in a clockwise direction to effect closing of the circuit breaker. Upon release of the handle, the closing lever 143 is immediately returned to open position by the retrieving springs 151 and these springs acting through the closing lever and the thrust link, also return the operating handle 155 to its neutral position. The circuit breaker may also be manually tripped to cause opening thereof by rotating the operating handle 155 through a small angle in a counterclockwise direction. When the operating handle 155 is thus moved, a projection (not shown) on the thrust link 157 engages an insulating element 161 secured to the portion 123 of the tripping toggle link 115 and moves this link upwardly to cause collapse of the tripping toggle. This results in opening of the circuit breaker in the manner previously described.

The trip device 29 comprises a shunt trip electromagnet 163 secured to a portion 164 of the frame 31. The shunt trip electromagnet has a movable core (not shown) secured to the trip plunger 139. The trip plunger 139 is movable vertically in the shunt trip electromagnet and has a portion extending through the bottom plate of the electromagnet. The shunt trip electromagnet may be energized in a manner well known in the art. The trip device also includes a plurality of series overload tripping means (only one being shown), there being one such tripping means for each of at least two of the poles of the circuit breaker. Each of the series overload tripping means comprises a U-shaped laminated magnet core 165 and a frame comprising a pair of plates 167 joined by a yoke portion 169. The frame 167 and the magnet core 165 are secured to the breaker base 11 by bolts 171 (only one being shown) which extend through the feet of the frame 167 and through the magnet core 165. The terminal conductor 15 passes between the legs of the U-shaped magnet core 165 so that the flow of current through this conductor serves to energize the magnet. A trip lever 173 comprising a pair of parallel levers 174 (only one being shown) is pivotally supported between the spaced sides of the frame 167 by means of a pivot pin 175. The levers 174 are joined at their outer ends by an integral cross-member 177, and a laminated armature 179 is secured to the inner ends of the levers 174 comprising the tripping lever 173. The cross-bar 177 of each trip lever carries an adjusting screw 181 for engaging an arm 183 carried by a trip bar 185. The trip bar 185 extends across all of the poles of the circuit breaker and is rotatably mounted on a U-shaped bracket 187 secured to the lower end of the shunt trip electromagnet 163. The trip bar 185 is provided with an arm 183 for each of the trip levers 173. The arm 183 of the center pole tripping means is in alignment with the lower end of the trip plunger 139, which is adapted to be thrust upwardly thereby when any one of the series overload tripping means is operated to rotate the trip bar 185. Each trip member 173 is biased in a clockwise direction by spring means 191 connected at its upper end to the trip member 173. An adjusting screw 193 is provided for the purpose of adjusting the tension of the spring means 191 to vary the overload tripping point of each overload tripping means. During normal current conditions, the pull of the magnet core 165 on the armature 179 is insufficient to overcome the force of the spring means 191. However, when an overload of predetermined value occurs in the circuit, the pull of the magnet core 165 of the affected pole becomes sufficient to attract the armature and move the trip member 173 in a counterclockwise direction. This movement rotates the trip bar 185 in a clockwise direction and causes the trip plunger 139 to be moved upwardly and effect collapse of the tripping toggle and opening of the circuit breaker.

As has previously been explained, the circuit breaker in addition to being operated to closed position manually by the operating handle 155 is also adapted to be operated to the closed position by the electric motor operating means 27. The motor operating means includes a cast housing 195 having an electric motor M (Fig. 4) of the universal type mounted in the lower portion thereof. The upper portion 197 of the housing 195 is formed to provide a gear casing which contains a reduction gear and a counter-shaft 199 (Figs. 2 and 3), connected for rotation by the motor through the reduction gear. The counter-shaft 199 is rotatably mounted in a bearing 201 (Fig. 3) provided in the gear housing, and the reduction gear comprises a worm gear 203 which is non-rotatably secured to a portion of the counter-shaft 199, and a worm 205 (Fig. 2) which meshes with the worm gear and is adapted to be driven by the shaft of the electric motor. The counter-shaft 199 has a shoulder portion 206 (Fig. 3) which engages the bearing 201 adjacent one end of the shaft, and the other end of the shaft has a nut 207 threaded thereon for retaining the shaft in rotatably mounted position in the gear housing and also for retaining the worm gear 203 on the shaft. A cover plate 209 is removably secured to the open side of the gear housing by means of screws 211. A crank disc 213 is rigidly secured to the end of the counter-shaft 199 which extends outside of the housing, and this crank disc carries an anti-friction crank roller 215 for engaging the curved surface 217 (Fig. 1) of an operating plate 223 secured to the side of the closing lever 143 adjacent the outer end thereof. The housing 195 has a flat mounted plate 225 which is removably secured by bolts (not shown) on the side of the circuit breaker mechanism frame 31. The motor unit is accurately positioned relative to the closing lever 143 by suitably positioned dowel holes (not shown) in the mounting plate 225, which are adapted to engage the extending ends of fixed pivot pins 107 and 33.

Figure 2:
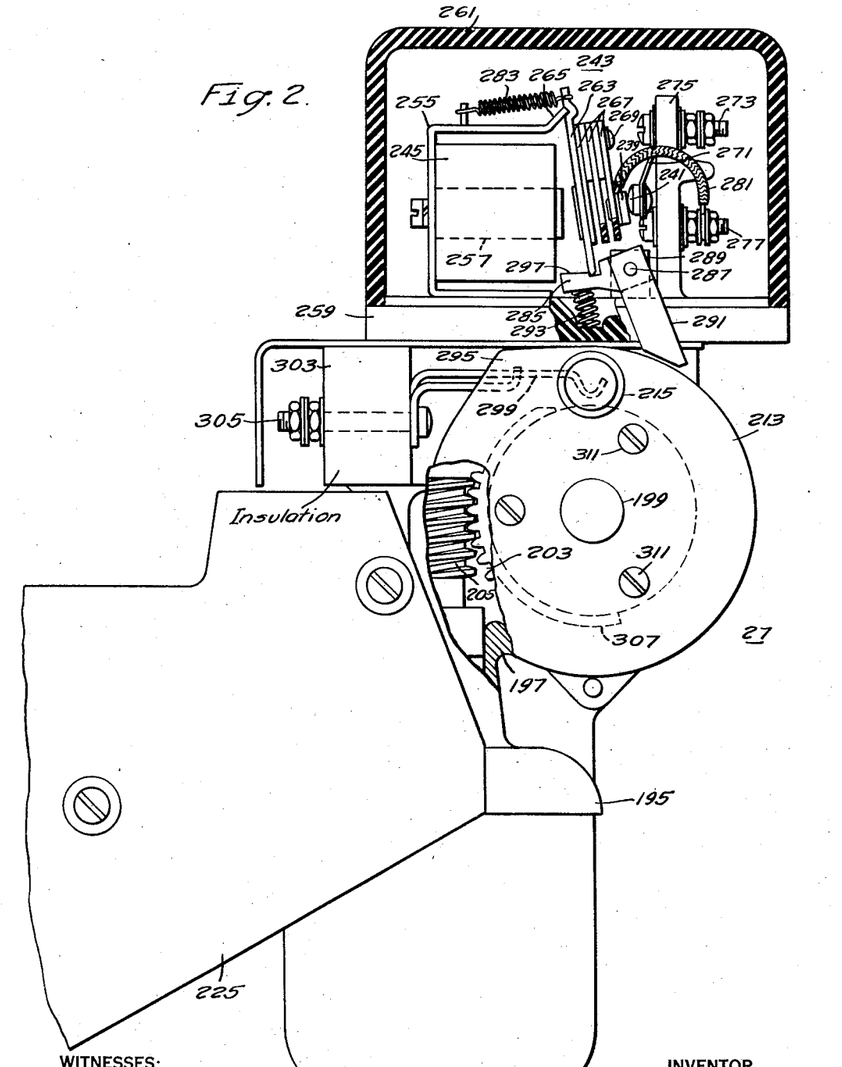
Fig. 2 is an enlarged view, partly in section, of the motor operating mechanism and the anti-pump relay, the parts being shown in their normal position.

When the electric motor is energized, the crank disc 213 and crank roller 215 are rotated in a clockwise direction as viewed in Figs. 1 and 2, through substantially one complete revolution. During the initial portion of this rotation of the crank disc, the crank roller 215 thereon is moved into engagement with the curved surface 217 of the operating plate 22. As the crank disc continues its rotation, the crank roller 215 rolls along the curved surface 217 of the operating plate, thereby moving the closing lever 143 to closed position to effect a closing operation of the breaker, after which the crank roller passes out of engagement with the operating plate and is finally brought to a stop approximately in the original position shown in Figs. 1 and 2. A limit switch to be described hereinafter, is associated with the crankshaft 199 and is arranged to open the motor energizing circuit and deenergize the motor. A centrifugal brake (not shown) is associated with the motor shaft for bringing the motor to a stop after deenergization of the motor. The centrifugal brake is preferably of the same construction as that disclosed in the copending application of John W. May, Serial No. 391,243, filed May 1, 1941, issued July 18, 1944, as Patent No. 2,354,135 and assigned to the assignee of the present invention.

It is highly desirable in the type of circuit breaker disclosed, and also in other types of motor operated or electrically operated circuit breakers, to automatically deenergize the closing means following completion of the closing operation of the closing means and to provide control means for preventing "pumping" or recurrent closing operations in the event the circuit breaker fails to remain closed during any single control operation.

In accordance with the invention, the motor operating means of the circuit breaker is provided with a novel control system for controlling energization of the motor, wherein pumping or recurrent closing operations are reliably prevented during any single control operation by the operator.

Figures 3, 4:
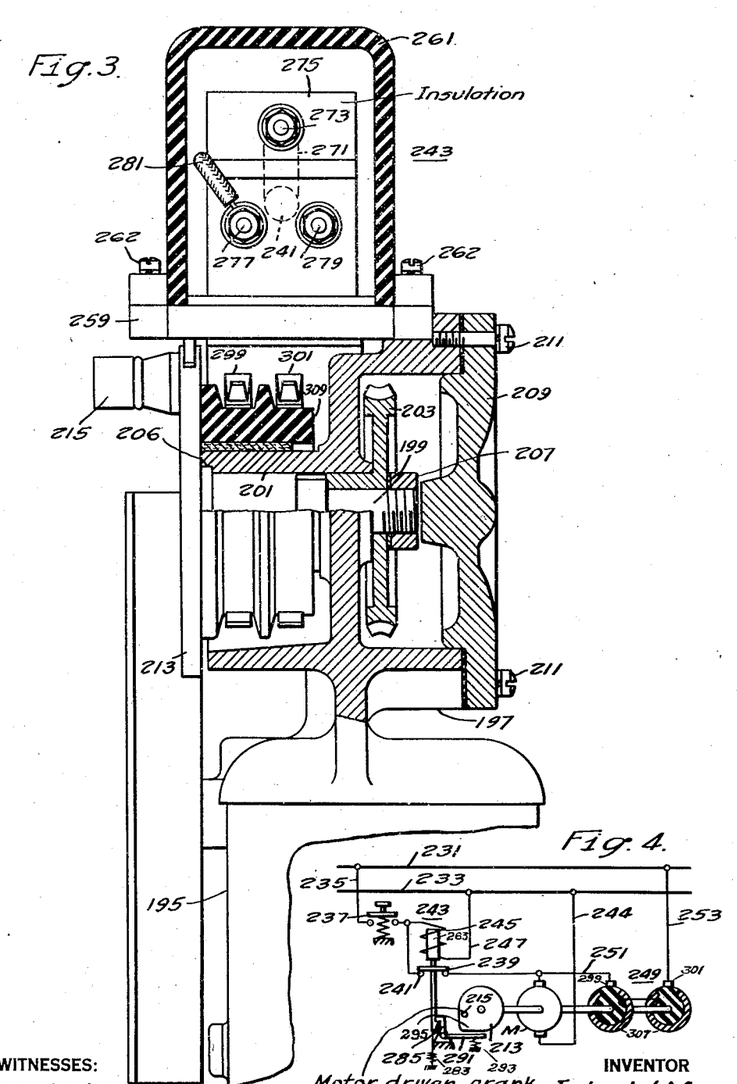
Fig. 3 is a fragmentary front view, partly in section of the motor operating mechanism shown in Fig. 2.
Fig. 4 is a diagrammatic view of the motor control system.

Referring to Fig. 4, which diagrammatically shows the motor operating means and the motor control system, the reference characters 231 and 233 designate supply lines of a supply circuit of appropriate voltage. The electric motor is adapted to be energized from the supply circuit and is connected in an energizing circuit which extends from the supply conductor 231, through a conductor 235, through the contacts of a manually operable push button closing control switch 237, contacts 239 and 241 of an electromagnetic relay indicated generally at 243 which will be hereinafter described, and through conductor 244 to the opposite supply line 233. The energizing circuit for the winding 245 of the anti-pump relay 243 extends from the supply conductor 231, through conductor 235, push button switch 237, winding 245 of the relay, and conductor 247 to the supply conductor 233. Thus the anti-pump relay is energized by the closing of the push button control switch 237 and remains energized as long as the switch 237 is held closed.

A limit switch indicated generally at 249 of the rotary type is operated in accordance with the position of the crank disc 213 and crank roller 215, and this limit switch is connected in parallel relation to the push button control switch 237 and the relay contacts 239, 241 which are disposed in series in a portion of the motor energizing circuit. One terminal of the limit switch is connected to the terminal of the motor by a conductor 251, and the other terminal of the limit switch is connected to the supply conductor 231 by a conductor 253. The limit switch, which will be described more fully hereinafter, is arranged to close shortly after operation of the crank disc is initiated and remains closed until after the crank roller 215 disengages the operating plate of the closing lever after which the limit switch opens and deenergizes the motor.

Referring to Fig. 2, the anti-pump relay 243 comprises a U-shaped magnet frame 255 of magnetic material having a central core 257 of magnetic material secured to the center of the bight portion thereof between the legs of the frame. The magnet frame is mounted on a base 259 of insulating material which is removably secured by a plurality of screws (not shown) to the upper end of motor or mechanism housing 195. A cover 261 of insulating material is secured to the base 259 by screws 262 (Fig. 3), and this cover serves to enclose the relay. An armature 263 comprising a general flat plate of magnetic material is pivotally mounted at its upper end on a pair of upstruck ears 265 (only one being shown) formed on the upper leg of the magnet frame 255.

An energizing winding comprising a winding spool 245 is mounted on the central core member 257 for energizing the electromagnet.

A plurality of strips 267 of insulating material are secured to the armature in a suitable manner as by means of a rivet 269, the outer strips being spaced apart by means of spacer elements of insulating material. The movable contact 239 of the relay is secured to the outermost insulating strip 267 adjacent the end thereof in any suitable manner, as for example, by riveting the contact element to the strip. The stationary contact 241 of the relay is secured to the free end of a strip 271 of resilient conducting material, the opposite end of which is secured by a terminal bolt 273 to the upper end of a terminal post 275 of insulating material. The terminal post 275 is formed integral with the base 259 and projects upwardly therefrom. A pair of terminal bolts 277 and 279 (Fig. 3) extend through the insulating terminal post 275 adjacent the lower end thereof, all of the terminal bolts being spaced a safe electrical distance from one another. The movable contact 239 of the relay is adapted to normally engage the relatively stationary resiliently mounted contact 241, and the movable contact is connected by a flexible shunt conductor 281 to the lower terminal 277.

The armature 263 of the electromagnet is biased to unattracted position away from the fixed core 257 by means of a tension spring 283, one end of which is connected to the upper end of the armature 263, the other end of the spring being anchored to a lug which is struck upwardly from the magnet frame 255. When the electromagnet is deenergized, the spring maintains the contact 239 in engagement with the relatively fixed contact 241. The attractive force of the electromagnet when the winding thereof is energized is more than sufficient to overcome the tension of the spring 283 and consequently, would be more than sufficient to pull the armature to attractive position if the armature were not otherwise restrained in unattractive position. The armature, however, normally is held in its unattractive position and prevented from being moved to attracted position by means of a latch 285 which is secured to a shaft 287 rotatably mounted in a bearing 289, the bearing 289 being secured to the base of the relay. An arm or cam follower 291 is rigidly secured to the opposite end of the latch shaft 287 and the lower portion of this arm or cam follower cooperates with the edge of the rotatable crank disc 213. The latch 285 is biased to latching position by means of a compression spring 293 which is disposed in a recess provided therefor in the base of the relay. The lower end of the arm 291 is beveled and disposed in very close proximity to the periphery of the crank disc 213, and the greater portion of the periphery of the crank disc is circular, that is, has a fixed radius of curvature with respect to the central axis of the crank shaft 199. A cam-shaped projection 295 is formed on the periphery of the crank disc 213 and this cam projection is adapted to engage the latch arm 291 and move the latch 285 to released position to effect release of the armature 263 when the crank disc 213 has been rotated through a predetermined distance during the initial portion of the operation thereof. As soon as the latch is moved to released position by the cam projection 295, the armature 263 is immediately moved to attracted position against the magnet core 257, thereby causing opening of the contact 239 of the relay. When the armature is in its attracted position, the lower latch edge thereof is still in engagement with a nose or surface 297 on the latch so that the latch is maintained in its released position against the force of the spring 293. When the electromagnet 245 is deenergized and the cam projection 295 is no longer beneath the cam follower or arm 291, the spring 283 returns the armature to its unattracted position and the latch 285 is thereupon returned to latching position by the spring 293 to latch the armature in its unattracted position, the contacts 239 and 241 being closed in this unattracted position of the armature. The latch nose or surface 297 of the latch is preferably slightly inclined so that the latch does not impede return of the armature to its unattracted position by the spring 283 upon deenergization of the electromagnet. If desired, the inclination of the surface 297 may be such as to slightly aid the return movement of the armature to its unattracted position upon deenergization of the magnet. Since the contacts 239 and 241 are disposed in series with the push button control switch 237 in the energizing circuit of the motor, the motor cannot be energized by means of the control switch when the relay contacts 239, 241 are open.

The limit switch 249 comprises a pair of resilient spring contact fingers 299 and 301 (Fig. 3) only one of which is visible in Fig. 2. The contact fingers 299 and 301 are mounted on a block 303 of insulating material secured to the motor mechanism housing 195, the contact fingers being secured to this block, each by a separate terminal bolt 305 (only one being shown). The movable bridging contact of the limit switch comprises arcuate contact segments 307 of conducting material which are secured to the surface of a drum 309 of insulating material. The segments 307 are of the same length and are electrically connected together by a conductor not shown. These two segments will hereinafter be referred to as the bridging contact segment 307 since they are electrically connected and act as a bridging contact. The drum 309 is carried by the crank disc 213 and is secured thereto by a plurality of screws 311 (Fig. 2). The bridging contact segment 307 of the limit switch is of such length and so disposed on the drum 309 that it is brought into bridging engagement with the contact fingers 299 and 301 to close the limit switch shortly after the crank disc 213 starts its revolution in a clockwise direction, and the length of the segment is such that it maintains contact with the fingers 299 and 301 until after the crank roller 215 has completed a closing operation of the circuit breaker closing lever and has passed out of engagement with the operating plate 223 of the closing lever, thereby maintaining the motor energized until the motor mechanism has completed a closing operation. After the closing operation of the motor mechanism has been completed, the trailing end of the briding contact segment 307 passes out of engagement with the contact fingers 299 and 301 thereby effecting deenergization of the motor, and the centrifugal brake (not shown) brings the motor to a stop with the crank disc approximately in the position shown in Figs. 1 and 2. The leading edge of the bridging contact segment 307 is so located with respect to the cam projection 295 that the limit switch is closed a short time prior to the time when the cam projection 295 effects release of the latch 285, whereby the relay contacts 239 and 241 will not open until after the limit switch closes. By this construction, no current interruption ever takes place on the relay contacts 239 and 241.

The operation of the motor mechanism is briefly as follows. To close the circuit breaker by means of the motor mechanism, the operator depresses the push button switch 237 to initiate the electric closing operation. The closing of the push button switch effects energization of the motor M through the relay contacts 239 and 241, which are normally in closed position and held in closed position by reason of the latch 285 which normally holds the armature 263 of the relay in unattracted position. The push button switch 237 also completes the energizing circuit for the winding of the relay 243. Energization of the winding, however, does not at this time effect movement of the armature 263 to attracted position since the armature is held latched in unattracted position by the latch 285. As soon as the motor is energized, it starts to rotate the crank disc 213 in a clockwise (as viewed in Figs. 1 and 2) or closing direction. Shortly after the disc 213 starts to rotate and prior to the time that the crank roller 215 comes into contact with the operating plate 223 of the closing lever, the bridging contact segment 307 of the limit switch engages the contact fingers 299, 301 and thereby completes an energizing circuit for the motor which is independent of the push button control switch 237 and the relay contacts 239 and 241. Shortly after the limit switch closes, the cam projection 295 engages the latch arm 291 and causes the latch to release the armature 263 so that if the push button switch is held in closed position, the armature will be immediately moved to attracted position by the electromagnet and effect opening of the anti-pump relay contacts 239, 241 and hold these contacts in open position as long as the push button control switch is held in closed position. The limit switch maintains the energization of the motor until after the crank roller 215 has passed out of engagement with the operating plate and the motor mechanism has completed a closing operation, after which the limit switch opens, deenergizing the motor, and the centrifugal brake brings the crank disc to a stop approximately in the position shown in Figs. 1 and 2. If the manual push button control switch is held in closed position after projection 295 releases latch 285, it will not effect reenergization of the motor since the coil 245 is then energized and the anti-pump relay contacts are held in open position by the magnetic attraction of the armature 263. Thus, it is impossible for the mechanism to pump or produce recurrent closing operations if the operator holds the control switch 237 closed.

When the push button control switch 237 is released, the electromagnet of the relay is deenergized and the armature 263 is returned to latching position by the spring 283, after which it is possible for the operator to again effect energization of the motor by means of the closing control switch 237.

The provision of the latch for holding the armature in unattracted position permits the electromagnet to be constructed with a relatively small air gap between the armature and core and enables the winding of the relay to be energized from full voltage of the supply circuit so that a very strong holding force is applied to the armature to hold it in attracted position. This provides a substantially shock-proof arrangement so that the relay will not fail because of severe shocks or jars which might otherwise cause the armature to return to unattracted position and close the relay contacts. Another important advantage of the construction is that no current is ever interrupted by the relay contacts 239 and 241 due to the fact that the limit switch closes prior to opening of the relay contacts.

While the invention has been disclosed in accordance with the provisions of the patent statutes, it is to be understood that various changes and modifications of the construction thereof may be made without departing from some of the essential features of the invention. It is desired, therefore, that the language of the appended claims be given the broadest reasonable interpretation permissible in the light of the prior art.

I claim as my invention:

1. In a circuit breaker, motor operating means for said circuit breaker comprising a rotatable member rotatable through a cycle to effect closing operation of the breaker, an electric motor for rotating said member, a supply circuit for energizing said motor, circuit means including a control switch for energizing said motor, an electromagnetic relay having contacts connected in a portion of the circuit of said motor and an armature movable to an attracted position to open said contacts, a latch normally restraining said armature in unattracted position, means operable in accordance with a predetermined movement of said rotatable member to cause said latch to release said armature and thereby permit operation of said relay and means operable after energization of said motor for maintaining said motor energized independently of said control switch to complete an operation of said motor and to then deenergize said motor.

2. In a circuit breaker, electrical operating means for closing the circuit breaker, circuit means including a control switch for energizing said operating means, an electromagnetic relay having contacts in a portion of the energizing circuit of said operating means, and having only a single armature for controlling said contacts, said armature being movable to an attracted position to effect opening of said contacts, holding means normally preventing movement of said armature to attracted position, means operated in accordance with a predetermined operation of said operating means for causing said holding means to permit movement of said armature, and means operable after said operating means is energized for maintaining said electrical operating means energized independently of said control switch to complete an operation of said operating means and to then deenergize said operating means.

3. In a circuit breaker, electrical operating means for producing a closing operation of the circuit breaker, circuit means including a control switch for energizing said operating means, an electromagnetic relay energized when said control switch is closed and having contacts connected in a portion of the energizing circuit of said operating means and having only a single armature for controlling said contacts, said armature being movable to attracted position to effect opening of said contacts, a latch normally preventing movement of said armature to attracted position, means operable upon predetermined movement of said operating means to cause said latch to release said armature, and means operable after said operating means is energized for maintaining said electrical operating means energized independently of said control switch to complete an operation of said operating means and to then deenergize said operating means.

4. In a circuit interrupter, electric motor operating means for said circuit interrupter comprising a rotatable member rotatable to effect closing operation of the interrupter, an electric motor for rotating said member, circuit means including a control switch for energizing said motor, an electromagnetic means energized when said control switch is closed and having contacts connected in a portion of the energizing circuit of said motor and having only a single armature for controlling said contacts, said armature when moved to attracted position effecting opening of said contacts, holding means normally preventing movement of said armature to attracted position, means operable upon predetermined movement of said rotatable member to cause said holding means to permit movement of said armature to attracted position, and means operable after said motor is energized to maintain said motor energized independently of said control switch to complete an operation of said operating means and to then deenergize said motor.

5. In a circuit interrupter, electric motor operating means for said interrupter comprising a rotatable member for effecting closing of said circuit interrupter, a motor for rotating said member, circuit means including a control switch for energizing said motor, electromagnetic means energized as long as said control switch is closed having a set of contacts in a portion of the energizing circuit of said motor and having an armature which when moved to attracted position effects opening of said contacts, holding means normally preventing movement of said armature to attracted position, means operable upon predetermined rotation of said member to cause said holding means to permit movement of said armature to attracted position, and means including a limit switch operable after initiation of operation of said operating means to maintain said motor energized independently of said control switch to complete an operation of said operating means and to then open said motor circuit.

6. In a circuit interrupter, electric motor operating means for said circuit interrupter comprising a rotatable member rotatable to effect closing operation of the circuit interrupter, an electric motor for rotating said member, circuit means including a control switch for energizing said motor, an electromagnetic relay energized as long as said control switch is closed having a set of contacts in a portion of the energizing circuit of said motor and having only a single armature for controlling said contacts, there being a relatively small air gap between the magnet and armature in the full open unattracted position of said armature and the attraction force being more than sufficient to move said armature to attracted position, said armature when moved to attracted position effecting opening of said contacts, a latch normally preventing movement of said armature to attracted position, means operable upon predetermined movement of said rotatable member to cause said latch to release said armature, and means operable after said motor is energized to maintain said motor energized independently of said control switch to complete an operation of said operating means and to then deenergize said motor.

7. In a circuit breaker, electric motor operating mechanism for said breaker comprising a rotatable member for closing the circuit breaker, an electric motor for rotating said member, a supply circuit for energizing said motor, means controlling energization of the motor circuit including a control switch, an electromagnetic relay energized with full voltage of said supply circuit as long as said control switch is closed and having a set of contacts in the motor circuit and having only a single armature for controlling said contacts, said armature when moved to attracted position effecting opening of said contacts, the electromagnet having a relatively small air gap between the armature and magnet when the armature is in full open air gap position and the attractive force being more than sufficient to move said armature to attracted position, a latch normally preventing movement of said armature to attracted position, means operable upon predetermined rotation of said rotatable member for causing said latch to release said armature, and means operable after said motor is energized to maintain said motor energized independently of said control switch to complete an operation of said operating means and to then deenergize said motor.

8. In a circuit breaker, electrical operating means for closing the circuit breaker, circuit means including a control switch for energizing said operating means, an electromagnetic relay energized as long as said control switch is closed having a set of contacts in a portion of the energizing circuit of said operating means and having an armature operable when moved to attracted position to effect opening of said contacts, the attractive force of said electromagnet when energized being sufficient to move said armature from fully unattracted position to attracted position and constituting the only force for moving said armature to attracted position, a latch normally preventing movement of said armature to attracted position, means operable upon predetermined movement of said operating means to cause said latch to release said armature and means comprising a limit switch operable after initiation of operation of said operating means to maintain said operating means energized independently of said control switch to complete an operation of said operating means and to then open the energizing circuit of said operating means.

9. In a circuit interrupter, electric operating means for closing the circuit interrupter, circuit means for controlling energization of said operating means comprising a control switch for energizing said operating means, an electromagnetic relay, energized as long as said control switch is in closed position, having a set of contacts in a portion of the energizing circuit of said operating means and having an armature operable when moved to attracted position to effect opening of said contacts, holding means normally preventing movement of said armature to attracted position, means operable upon predetermined movement of said operating means to cause said holding means to permit movement of said armature to attracted position, and means comprising a limit switch operable after initiation of operation of said operating means to maintain said operating means energized independently of said control switch to complete an operation of said operating means and to then open the energizing circuit of said operating means.

10. In a circuit breaker, electric motor operating means comprising a rotatable member for closing the circuit breaker, a motor for rotating said member, circuit means including a control switch for energizing said motor, an electromagnetic relay, energized as long as said control switch is closed, having a set of contacts in a portion of the energizing circuit of said motor and having an armature operable when moved to attracted position to effect opening of said contacts, holding means normally preventing movement of said armature to attracted position, means operable upon predetermined rotation of said rotatable member to cause said holding means to permit movement of said armature to attracted position, and means comprising a limit switch connected in shunt relation to said control switch and the contacts of said relay, and operable after initiation of operation of said motor operating means to maintain said motor energized independently of said control switch to complete an operation of said operating means.

11. In a circuit interrupter, electric motor operating means comprising a rotatable member for closing the circuit breaker, a motor for rotating said member, circuit means including a control switch for energizing said motor, an electromagnetic relay energized as long as said control switch is closed having a set of contacts in a portion of the energizing circuit of said motor and having an armature operable when moved to attracted position to effect opening of said contacts, a latch normally preventing movement of said armature to attracted position, means operable upon predetermined rotation of said member to cause said latch to release said armature, and a limit switch actuated in accordance with predetermined operation of said motor and electrically connected in shunt relation to said control switch and said contacts, said limit switch being closed after initiation of operation of said motor operating means and prior to release of said latch and remaining closed to complete an operation of said mechanism.

12. A motor control system comprising a supply circuit, an electric motor energized from said supply circuit, a cutout switch in a portion of the motor circuit, spring means for biasing said cutout switch to closed position, an electromagnet for opening said switch, said electromagnet having only a single armature, circuit means including an operator's switch operable when closed to energize said motor from said supply circuit through said cutout switch and to also energize said electromagnet from said supply circuit, holding means normally preventing opening of said cutout switch, said holding means being operative to permit opening of said cutoff switch after predetermined rotation of said motor, and means operable after energization of said motor for maintaining said motor energized for a predetermined cycle of operation and to then deenergize said motor.

13. A motor control system comprising a supply circuit, an electric motor energized from said supply circuit, a normally closed cutout switch in a portion of the motor circuit, an electromagnet for opening said cutout switch, circuit means including an operator's switch operative when closed to energize said motor from said supply circuit through said cutout switch and to also energize said electromagnet from said supply circuit, holding means normally preventing opening of said cutout switch, a limit switch for maintaining said motor energized from said supply circuit independently of said operator's switch and cutout switch for a predetermined cycle of operation after said motor has been started by said operator's switch, and means operable by said motor for releasing said holding means.

JOHN W. MAY.